W. BAUMAN.
COTTON CHOPPER AND CULTIVATOR.
APPLICATION FILED OCT. 22, 1909.
974,015.
Patented Oct. 25, 1910.
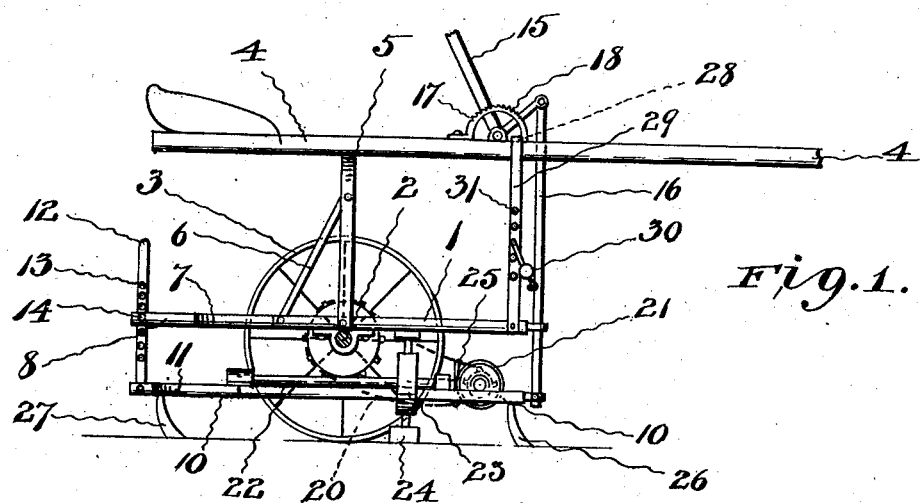
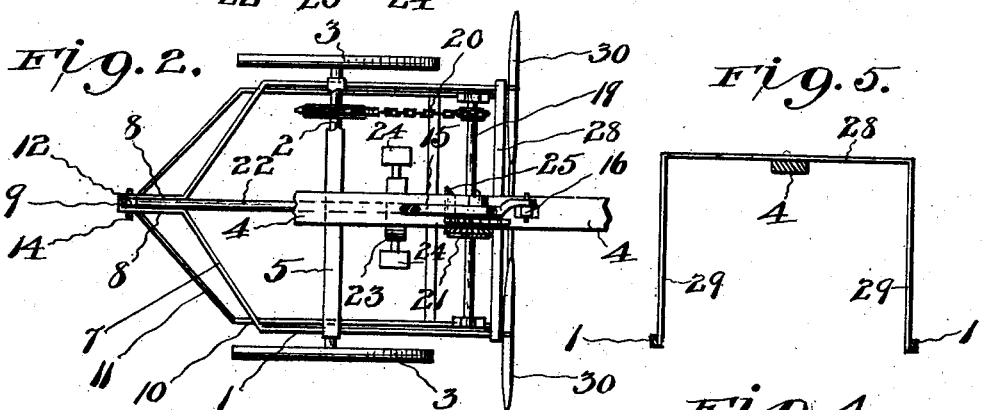
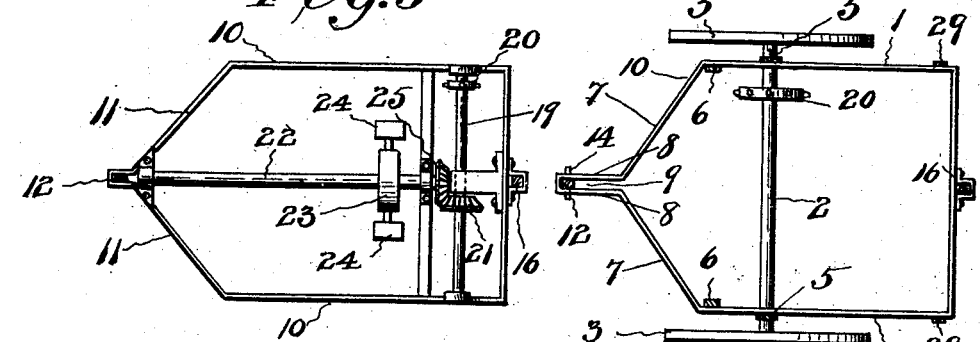
WITNESSES
Jos H Blackwood
W C Blackwood
INVENTOR
William Bauman
by James K. Polk
Attorney

UNITED STATES PATENT OFFICE.

WILLIAM BAUMAN, OF CHEYENNE, OKLAHOMA.

COTTON CHOPPER AND CULTIVATOR.

974,015.  Specification of Letters Patent.  Patented Oct. 25, 1910.

Application filed October 22, 1909. Serial No. 524,055.

*To all whom it may concern:*

Be it known that I, WILLIAM BAUMAN, a citizen of the United States, and a resident of Cheyenne, in the county of Roger Mills and State of Oklahoma, have invented certain new and useful Improvements in Cotton Choppers and Cultivators, of which the following is a specification.

My invention relates to devices for thinning growing cotton plants and cultivating the standing plants simultaneously; and it has for its object the provision of a machine consisting of a wheeled frame having the draft attachments secured thereto, and another frame carrying the chopping machinery and the cultivator blades mounted thereon and vertically adjustable relative to the wheeled frame.

My invention will be described in detail hereinafter and illustrated in the accompanying drawings, in which—

Figure 1 is a side view in elevation of my improved chopper and cultivator; Fig. 2, a top plan view; Fig. 3, a plan view of the lower frame; Fig. 4, a plan view of the upper frame; and Fig. 5, a detail view of the draft-bars showing the draft-pole in cross-section.

In the drawings similar reference characters indicate corresponding parts in the several views.

The frame 1 of my improved machine has the axle 2 journaled thereon, to which are secured the traction-wheels 3, while the rear end of the draft-pole 4 is secured to arch-shaped bar 5, secured to the sides of said frame 1, 6 indicating braces connecting the sides of said frame 1 and the upright portions of bar 5.

By mounting the frame 1 on a single axle and providing only two wheels to carry the machine it will be apparent that the draft will be reduced to a minimum, while at the same time it is made extremely easy to turn and guide in following the undulations of the rows of plants. The rear end of frame 1 is formed substantially Y-shaped in the rear of the ends of bar 5, as shown at 7, the portion forming the leg of the Y consisting of two parallel portions 8, spaced apart to form a slot 9.

10 indicates a second frame having its rear end formed V-shaped, as shown at 11, and provided with a rod 12, pivotally secured thereto and loosely mounted in slot 9, said rod being formed with a plurality of holes 13 to receive a pin 14 to adjust the height of the rear end of the frame. The front end of the frame is adjusted by a bell-crank lever 15, fulcrumed on draft-pole 4, and having one of its arms connected to the front end of frame 10 by means of a rod 16, while its other arm serves as an operating handle and is held in adjusted position by engaging notches or ratchet-teeth 17 in a circular bar 18, secured to the draft-pole.

19 indicates a shaft journaled transversely of frame 10, adjacent to its front end, said shaft being driven from the axle 2 by means of chain and sprocket gearing 20, and having a beveled gear-wheel 21 secured thereto.

22 indicates a shaft journaled longitudinally of frame 10 and having a cutting-wheel 23 secured thereto, with cutting-blades 24 mounted thereon, said shaft also having a beveled gear-wheel 25 secured thereto that meshes with gear-wheel 21 to rotate said shaft.

26 indicates cultivator-blades secured to the front end of frame 10, and 27 other cultivator-blades secured to the two sides of the V-shaped rear end, said blades being designed to break up the soil at each side of the row of plants at the same time that the chopping is progressing.

The draft-appliance consists of a cross-bar 28, secured to draft-beam 4, and bars 29, connecting the free ends of the bar 28 and the sides of frame 1, to which are secured the whiffletrees 30, said bars 29 being provided with a plurality of holes 31 to admit of adjusting the whiffletrees as desired to secure the most efficient operation of the draft arrangements.

In operation the frame 10 is adjusted up or down as desired for the most efficient operation of the cutting machinery by securing pin 14 in the proper hole 13 in rod 12 and adjusting bell-crank lever 15, the rear adjustment being in the nature of a stationary adjustment while the adjustment by the lever 15 is utilized to raise and lower the cutting-blades and cultivators in turning at the ends of rows and going to and from the field.

Having thus described my invention, what I claim is—

1. In a cotton-chopper and cultivator, a supporting frame, said frame having a rearwardly-extended slotted portion, an axle journaled on the frame, traction-wheels secured to said axle, a draft-beam secured to said supporting-frame, an adjustable frame having a rod pivotally secured to its rear end and engaging said slotted extension of the supporting frame and adjustably secured therein, a lever fulcrumed on the draft-beam, a rod connecting said lever and the front end of the adjustable frame, a shaft journaled transversely of the adjustable frame and geared to the axle aforesaid, a shaft journaled longitudinally of the adjustable frame and geared to the transverse shaft, and a cutting-wheel secured to said longitudinal shaft, substantially as shown and described.

2. A cotton chopper and cultivator comprising a frame having a Y-shaped rear end with the extreme end of the frame having parallel sides forming a slot, an axle journaled on said frame, traction-wheels secured to said axle, an arch-shaped bar secured to the frame, a draft-beam secured to said bar, a cross-bar secured to said draft-beam, vertical bars connecting the ends of said cross-bar and the sides of the frame, an adjustable frame having a rod pivotally secured to its rear end, said rod engaging the slotted extension of the first-mentioned frame and adjustably secured therein, a lever fulcrumed on the draft-beam, a rod connecting said lever and the front end of the adjustable frame, a shaft journaled transversely of the adjustable frame and geared to the axle aforesaid, a shaft journaled longitudinally of the adjustable frame and geared to the transverse shaft, and a cutting-wheel secured to said longitudinal shaft, substantially as shown and described.

In witness whereof, I have hereunto set my hand in presence of two subscribing witnesses.

WILLIAM BAUMAN.

Witnesses:
LEON YOUNG,
W. G. BLACK.